United States Patent [19]

Mintel et al.

[11] Patent Number: 5,208,952
[45] Date of Patent: May 11, 1993

[54] CLOSURE DEVICE FOR RIB LOCK

[75] Inventors: Thomas E. Mintel, Rahway; Henry D. Cross, III, Colts Neck, both of N.J.; Robert C. Sullivan, Chappaqua, N.Y.

[73] Assignee: Colgate-Palmolive Company, New York, N.Y.

[21] Appl. No.: 757,822

[22] Filed: Sep. 11, 1991

[51] Int. Cl.⁵ .............................................. A44B 21/00
[52] U.S. Cl. ...................................... 24/580; 24/575; 24/713
[58] Field of Search ............. 24/573.1, 576, 575, 24/580, 713.1, 16 R, 16 PB, 17 AP, 22, 23 R, 23 EE, 712, 20 EE, 713; 36/50

[56] References Cited

U.S. PATENT DOCUMENTS

| | | |
|---|---|---|
| 181,188 | 8/1876 | Lascell . |
| 218,880 | 8/1879 | Hill . |
| 318,369 | 5/1885 | Gottstein . |
| 765,227 | 7/1904 | Cummings . |
| 782,604 | 2/1905 | Funk . |
| 838,056 | 12/1906 | Riches . |
| 1,565,045 | 12/1925 | Bensch . |
| 2,315,414 | 3/1943 | Germany ............... 24/575 X |
| 2,359,229 | 9/1944 | Lord . |
| 3,263,292 | 8/1966 | Fekete . |
| 3,484,907 | 12/1969 | Elsenheimer . |
| 3,495,306 | 2/1970 | Eichberg . |
| 3,537,151 | 11/1970 | Sobel et al. . |
| 3,682,163 | 8/1972 | Plummer .................. 24/580 X |
| 4,291,439 | 9/1981 | Riti . |
| 4,428,101 | 1/1984 | Harkavy . |
| 4,780,936 | 11/1988 | Brecher . |
| 4,794,674 | 1/1989 | Mintel . |

FOREIGN PATENT DOCUMENTS

| | | | |
|---|---|---|---|
| 518012 | 3/1953 | Belgium ............... | 24/16 PB |
| 2397801 | 2/1979 | France ................. | 24/575 |
| 425857 | 10/1947 | Italy .................... | 24/712 |
| 1014768 | 12/1965 | United Kingdom ...... | 24/16 PB |

Primary Examiner—James R. Brittain
Attorney, Agent, or Firm—Robert C. Sullivan; Richard J. Ancel

[57] ABSTRACT

A closure mechanism for use in securing the ends as well as other portions of a pair of interlocking straps, laces, filaments and the like is disclosed. In one embodiment, the closure mechanism is in the form of a generally cylindrical enclosure having a cross-sectional shape which includes flat upper and lower surfaces with semi-circular ends. The closure mechanism may be used to secure a pair of thin planar, elongated strips, each of which has a plurality of ribs positioned transversely along the length thereof. Each of such ribs has a planar side face positioned at an angle of about 45 to 75 degrees relative to the plane of the upper surface of the planar strip to which it is attached. For optimal ease of engagement of the ribs of one strip with those of a second strip, the rear top surfaces of the ribs should be rounded or slightly relieved. The closure device of the present invention provides a high strength mechanism having a quick release feature for easy disengagement of the interlocking members.

5 Claims, 3 Drawing Sheets

CLOSURE DEVICE FOR RIB LOCK

BACKGROUND AND SUMMARY OF THE INVENTION

The present invention relates to a closure mechanism for a fastening and locking device. More particularly, the invention relates to a closure mechanism for use in maintaining the strap ends of a rib lock device in a closed or secured condition.

Previous devices for maintaining planar fastening members in a closed or secured condition are described in the following U.S. Pat. Nos.: 181,188 to Lascell; 218,880 to Hill; 318,369 to Gottstein; 4,291,439 to Riti; 4,428,101 to Harkavy; and 4,780,936 to Brecher.

By the present invention, there is provided an improved closure mechanism for use in securing the ends as well as other portions of a pair of interlocking planar members such as straps. The invention is particularly well suited for use in closure of a rib lock device such as that described in U.S. Pat. No. 4,794,674 to Mintel et al. which is incorporated by reference.

Accordingly, it is an object of the present invention to provide a closure device for the end portions of a pair of interlocking strap members.

It is an additional object of the present invention to provide a high strength mechanism having a quick release feature for use in securing a pair of interlocking strap members.

It is a further object of the present invention to provide a locking and fastening device for joining straps, laces, filaments and the like.

It is an additional object of the present invention to provide a quick release closure mechanism having components which are molded directly onto the straps of a closure device and additional components which serve as an enclosure for the straps.

DESCRIPTION OF THE PREFERRED EMBODIMENTS

Figure 1:
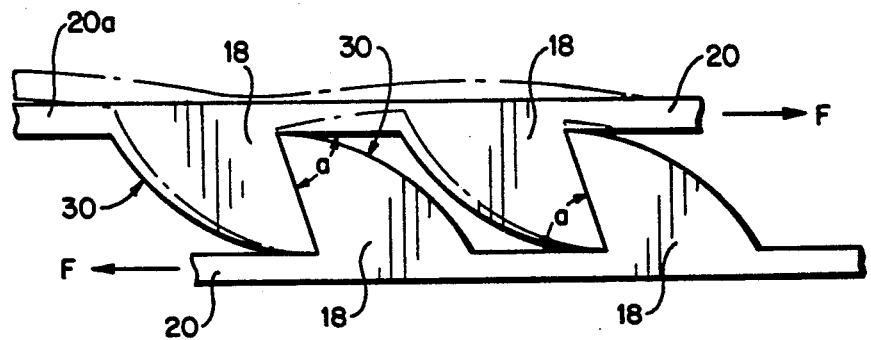
FIG. 1 is a side elevation showing two interlocking locking members in a rib lock fastener of the prior art.
Figure 2:
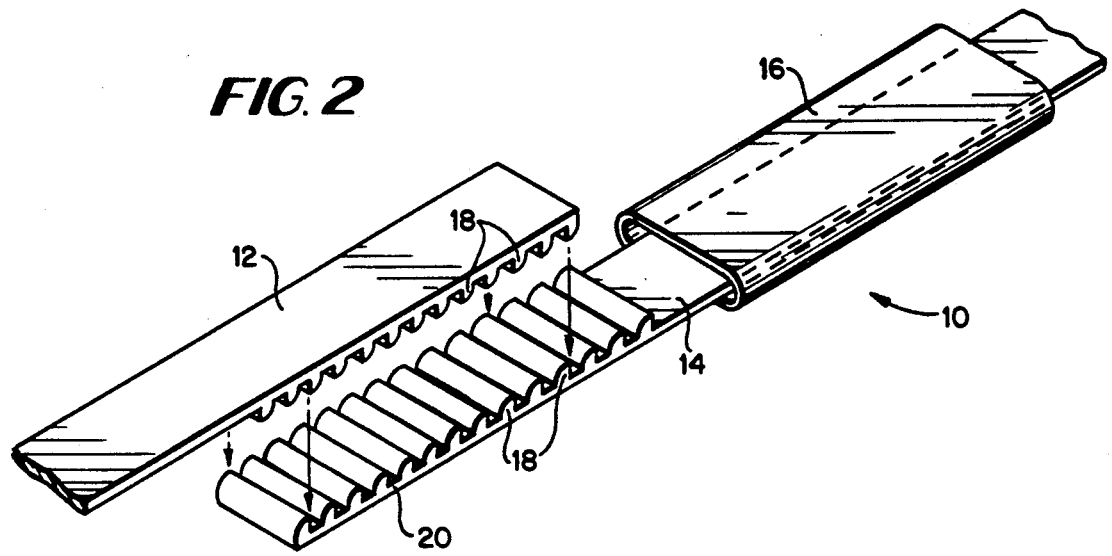
FIG. 2 is a perspective view of a first embodiment of a closure device of the present invention, showing the device in the open position.
Figure 3:
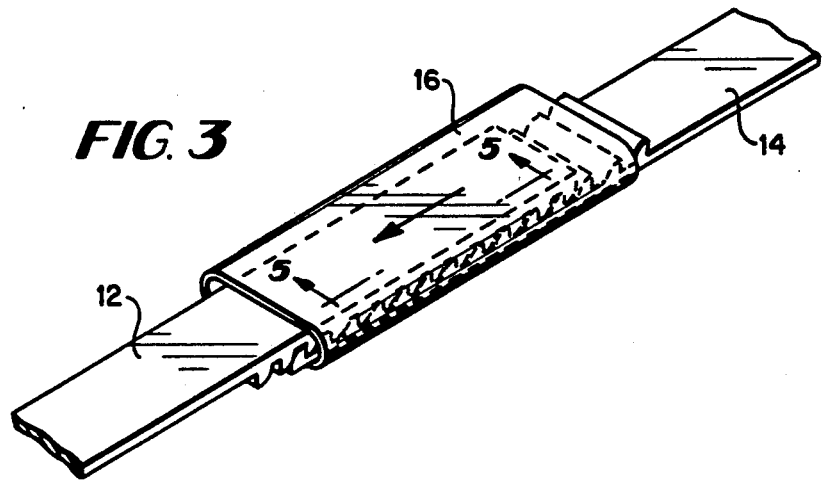
FIG. 3 a perspective view showing the closure device of FIG. 2 in the closed position.

In the embodiments of the invention as shown in FIGS. 2 through 5, there is provided a closure device 10 for a pair of ribbed strap members 12, 14. The strap members 12, 14 employ the rib lock configuration of FIG. 1 which is described in U.S. Pat. No. 4,794,674 incorporated herein by reference. In one embodiment, as shown in FIGS. 2 and 3, the closure device 10 is in the form of a generally cylindrical enclosure 16 having a cross-sectional shape which includes flat upper and lower surfaces with semi-circular ends.

As shown in FIG. 2, each of the strap members 12, 14 has a plurality of ribs 18 located adjacent the outer end portion of the respective strap 12, 14. Each of the ribs 18 has its planar side bearing surface angled at an angle "a" as shown in FIG. 1 of about 45 to 75 degrees relative to the plane of the upper surface of the strap material 20 upon which the ribs 18 are affixed. In one embodiment, an angle of approximately 60 degrees was employed.

Figure 5:
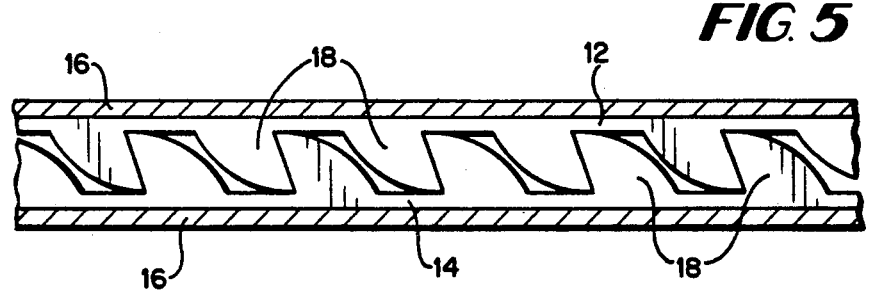
FIG. 5 is a cross sectional view taken along line 5—5 of FIG. 3.

The enclosure 16 should be of a size so as to fit snugly over the engaged straps 12, 14 in the closed position, as shown in FIG. 3, while being capable of being moved by a sliding motion to the open position of FIG. 2. The enclosure may be constructed of a suitable plastic or metal material. When the enclosure is in place over the ribbed straps 12, 14 as shown in FIG. 3, the relative position of the enclosure 16 with the straps 12, 14 will be as shown in FIG. 5.

Figure 4:
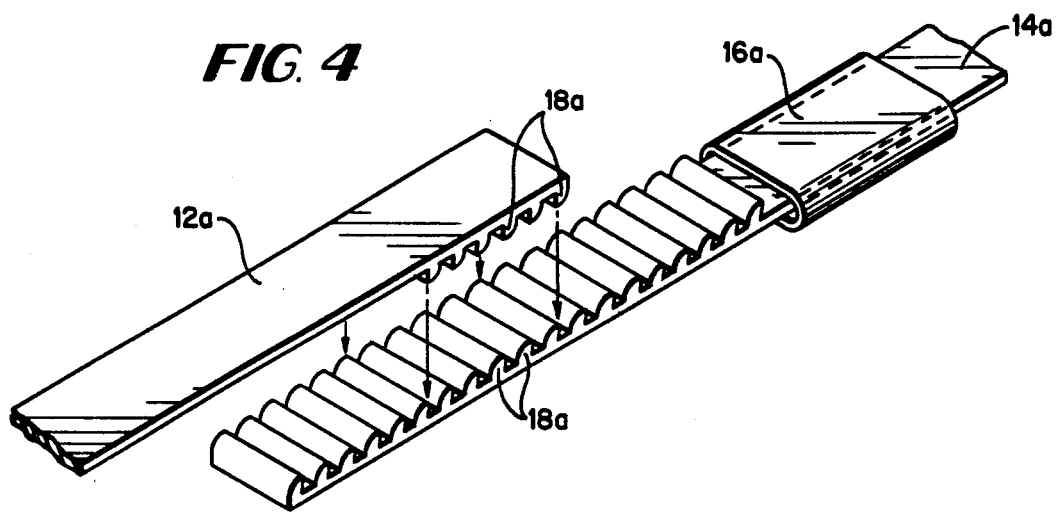
FIG. 4 is a perspective view showing a second embodiment of the invention in the open position.

In FIG. 4 there is shown an embodiment in which the upper strap 12a has a smaller number of ribs 18a than does the lower strap 14a. In this embodiment, strap 12a may be positioned in any of various locations along the length of strap 14a and the enclosure 16a then is moved accordingly to a position over the ribs 18a of the upper strap 12a as engaged with a corresponding number of ribs 18a on lower strap 14a.

With regard to the rib angle "a" of the ribs 18 relative to the plane of the upper surface of the material 20, as the angle becomes smaller, assuming the aspect ratio and the force "F" on the structure remain constant, stresses build up in the device 10. In this regard, aspect ratio is defined as the ratio of the length of the planar mating surface of the rib to the base of the rib. Also, as the rib angle becomes smaller, it becomes increasingly more difficult to fit the components together. Conversely, as the angle becomes greater, the shearing forces increase.

If a soft material is employed for the ribs 18, a smaller rib angle will be required. If a strong rib material is employed, larger rib angles can be effective. In the case of polyurethane ribs 18, for example, a rib angle of not more than 60 degrees is advantageously employed. In addition, the deflected shape of the device 10 cannot extend at an angle greater than 90 degrees or it will slip, as the ribs 18 from opposite straps 12, 14 will shear with respect to each other and opposing ribs 18 will separate from each other.

The ribs 18 have an aspect ratio of about one and have spacings between ribs approximately equal to the thickness of the ribs in a direction parallel to the longitudinal axis of the straps 12, 14. In one embodiment, the planar material is in the form of a strap having the ribs directly molded thereto to provide an integral, one-piece construction. In an alternative embodiment, the ribs 18 are individually affixed to a thin planar strip and the strip is then secured to a planar surface of a strap, lace or the like. The ribs 18 may also be individually affixed to the strap or lace.

Generally, the thickness of the ribs 18 will be proportional to the thickness of the planar strap portion 20. In this regard, the forces acting on the device 10 must not be so great as to cause the ribs 18 to separate from the ribs 18 of the opposing strap 20. Also, if bending around a radius, the straining forces must not be so great as to cause the ribs 18 to separate. To avoid this situation, the strap material 20 must be relatively thin and the ribs 18 must also be relatively thin.

When the forces are acting in one plane, the thickness of the material does not affect the bending strain imposed on the part. However, as the strap material is bent around a radius, the greater the degree of bending, the greater will be the necessity that the strap material be thinner in order to minimize the strain. Also, it is desirable that a smaller rib angle be employed under conditions of increased bending so as to provide a greater amount of tooth surface, thus compensating for the vertical forces tending to separate opposing ribs 18. Thus the bending forces imposed upon the device 10 are a function of the thickness and the radius of bending as well as the properties of the material.

For optimal engagement strength, the tops of the rib surfaces are parallel to the base plane, but for optimal ease of engagement, the rear top surface 30 of each rib 18 should be rounded or slightly relieved. Such a construction allows the ribs 18 to be raised and allowed to slide over each other. As shown in FIG. 1, the top surfaces 30 of adjacent ribs 18 from opposite straps 12, 14 preferably do not contact each other when in the secured position.

Depending on the desired strength and detailed fastening function, the rib material could range from that of a soft elastomer to that of a hard thermoplastic or thermosetting material. Also, the strap and ribs of the fastener do not necessarily have to be of the same material. The strap may be formed of a material such as polyester or fiberglass, for example. In one embodiment a ⅝ inch wide polyester ribbon was employed for each strap 12, 14 and ribs 18 were constructed of polyurethane in a segment one inch in length, thus providing ⅝ square inches of contact area for each strap 12, 14.

By the use of a finite element stress analysis, the geometry of the ribs 18 has been determined. The ribs 18 may be attached to or form part of any suitable surface, including a non-planar surface, so long as the ribs can be permanently adhered or molded to the supporting surface.

The closure mechanism of the present invention is intended to provide reinforcement for the engaged portions of the straps 12, 14 at the ends as well as along the length thereof. Through such reinforcement, the engaged portions will remain together and each strap end will be prevented from moving outwardly away from engagement with the opposite strap, such as during application of longitudinal forces "F" as shown in FIG. 1.

The configuration of the strap end 20a, as shown in the dashed line position in FIG. 1, indicates the uplifted or deflected condition which can result when forces "F" act as shown, in the absence of reinforcement to maintain the strap end in a flat condition.

Figure 6:
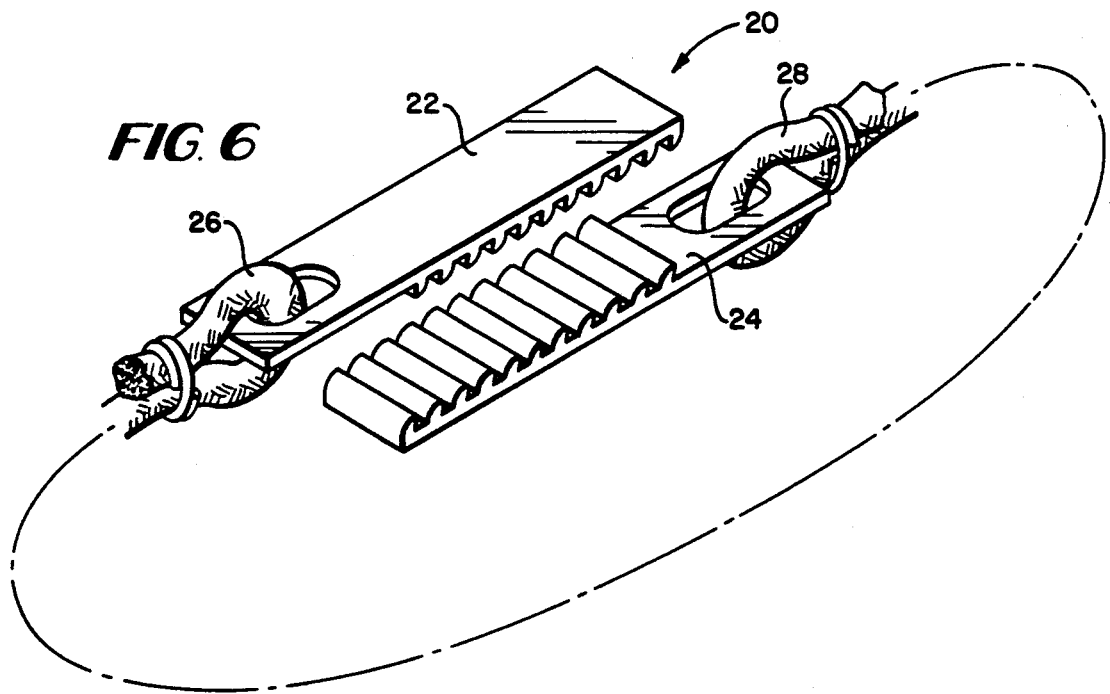
FIG. 6 is a perspective view showing a third embodiment of the invention in the open position.

In the embodiment as shown in FIG. 6, the straps 22, 24 of the device 20 are provided with hard back portions so that the strap ends will not move upwardly as long as the strap ribs remain under tension. In this embodiment, the straps 22, 24 are shown as being secured at opposite ends 26, 28 of a length of rope or cable. Thus a cover or enclosure is not needed for this embodiment. The stiffness required for the straps 22, 24 will depend on the particular use of the device 20. Thus if a tensile force of 100 lbs. will be required, a certain stiffness will be necessary but if a tensile force of 200 lbs. is required, a different degree of stiffness will be needed. Such a stiffness factor can be determined in terms of the flexural modulus, measured in lbs. per inch per inch. The stiffness for the straps 22, 24 should be sufficient to accomplish the required task, which is to prevent the straps 22, 24 from releasing contact with each other during application of tensile forces.

Figure 7:
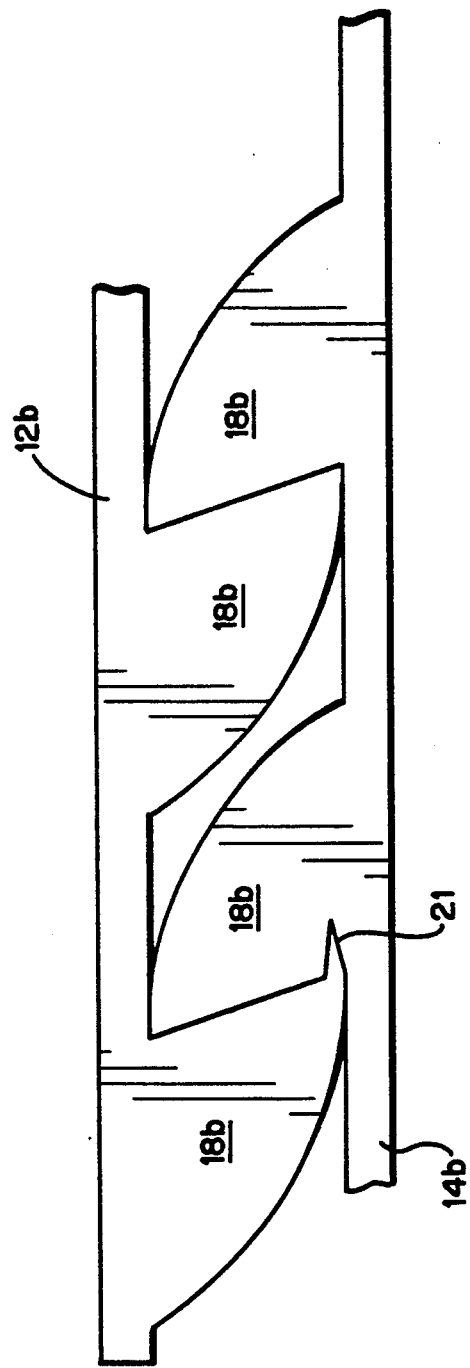
FIG. 7 is a cross sectional view showing a fourth embodiment of the invention.

In the embodiment of FIG. 7, one or more of the ribs 18b of one strap 12b is provided with a sharp knife edge member 21 of metal or other suitable material to penetrate the opposing rib 18b of the other strap 14b. The knife member 21 should be of sufficient size so as to penetrate into the opposing rib 18b and prevent the rib 18b carrying the knife member 21 from lifting up so as to separate the end portions of a pair of straps. This embodiment is particularly suitable when the ribs 18b are formed of polyurethane or a similar material, and with a knife edge member 21 being employed with each of one or more ribs 18b at the outer end of one or both straps 12b, 14b.

Two main purposes of the present invention are to provide a high degree of strength and an easy release feature. Thus under high tensile forces the device will remain strong and secure, while as soon as there is any compression force from either end, the device will release. In any application in which the two above described elements are required, the present closure device will meet the necessary qualifications. Under compression, the device is self-releasing unless a hard cover is provided over the device to hold down the strap members, in which case compression would not matter. Such a feature would not, however, be obtained with a Velcro-type closure.

One important feature of the present invention resides in the adjustability of the strap portion whereby the strap members may be secured anywhere along the length of the ribs.

If tension is present, the device is very strong. It is only when pressure is relieved or an end of one strap portion is lifted relative to the other strap portion that support is not provided.

A tab on the exterior of one or both strap portions may be provided, to assist in grasping and moving the present closure device.

As examples of uses of the present closure device, there can be mentioned wall mounted support fixtures camping equipment, military equipment, and belts for industry and also for wearing apparel. Other items of clothing may also employ the present closure. As an example of wall mounted support fixtures, the closure device could be used with tool holders wherein a support member with one strap is mounted on the wall and another strap is mounted on the back of the tool. Belts may be of the designer or functional type, so far as wearing apparel is concerned. In the industrial field, the closure device may be employed in the automobile industry, for example, with an adjustable length belt provided as a spare drive belt for use in various locations in an automobile.

The closure device of the present invention is easily adjustable over a wide range of lengths, in a manner similar to Velcro tape, but with the distinction that the present device has great strength under tensile pressure which Velcro does not. In addition, the geometry of the present device is of great importance, since it does not take up much space. Thus the invention provides a closure which operates in a limited space while having great strength.

The rib lock fastener with closure device may be advantageously employed for joining and fastening straps, laces and the like. In comparing the capabilities of the ribbed straps 12, 14 employed in the present fastener with a Velcro fastener having similar dimensions, it was found that a shear strength of 79 psi was obtained with the fastener of the present invention, whereas a shear strength of only 20 psi was obtained with the Velcro fastener. It was also found that a stiffness of 217 lbs./in. was obtained with the present ribbed straps 12, 14, whereas a stiffness of only 29 lbs./in. was obtained with the Velcro fastener. Thus the stiffness of the present fastener was an order of magnitude greater than that of the Velcro fastener.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fastener device comprising:
    a pair of strap structures having a plurality of identical ribs on each of said strap structures, each of said ribs extending across the respective strap structure form side to side thereof, said ribs each having a flat front face extending at an angle of about 45° to 75° with respect to said strap structures, each of said ribs having an arcuate rear face, the spacing between said ribs being such that when said ribs are interlocked with their flat front faces in locking engagement the respective rear faces are spaced apart to facilitate engagement and disengagement of said ribs; and wherein at least one rib is provided with a sharp knife edge member for penetrating the opposing rib when the strap structures are interlocked.

2. The fastener device of claim 1 wherein each of the strap structures is provided with a hard back portion having sufficient stiffness to assist in preventing the ribs of the respective strap structures from releasing contact with each other when interlocked during application of tensile forces.

3. A fastener device comprising:
    a pair of strap structures having a plurality of ribs on each of said strap structures, at least one rib being provided with a sharp knife edge member for penetrating the opposing rib when the strap structures are interlocked.

4. The fastener device of claim 3 wherein each of said ribs has a flat front face and an arcuate rear face.

5. The fastener device of claim 3 wherein each of the strap structures is provided with a hard back portion having sufficient stiffness to assist in preventing the ribs of the respective strap structures from releasing contact with each other when interlocked during application of tensile forces.

* * * * *